(12) United States Patent
Tan et al.

(10) Patent No.: US 12,088,232 B2
(45) Date of Patent: Sep. 10, 2024

(54) SHORT-CIRCUITING DEVICE AND ROBOT SYSTEM INCLUDING THE SAME

(71) Applicant: KAWASAKI JUKOGYO KABUSHIKI KAISHA, Kobe (JP)

(72) Inventors: Haruhiko Tan, Kobe (JP); Masahiko Sumitomo, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 904 days.

(21) Appl. No.: 16/982,627

(22) PCT Filed: Mar. 18, 2019

(86) PCT No.: PCT/JP2019/011166
§ 371 (c)(1),
(2) Date: Sep. 21, 2020

(87) PCT Pub. No.: WO2019/181849
PCT Pub. Date: Sep. 26, 2019

(65) Prior Publication Data
US 2021/0028727 A1      Jan. 28, 2021

(30) Foreign Application Priority Data

Mar. 19, 2018   (JP) .................... 2018-050815

(51) Int. Cl.
*H02P 3/22*      (2006.01)
*B25J 19/00*     (2006.01)

(52) U.S. Cl.
CPC ............ *H02P 3/22* (2013.01); *B25J 19/0004* (2013.01)

(58) Field of Classification Search
CPC ................................ H02P 3/22; B25J 19/0004
See application file for complete search history.

(56) References Cited

U.S. PATENT DOCUMENTS

| | | | |
|---|---|---|---|
| 8,736,219 B2 * | 5/2014 | Hofmann | B25J 19/06 363/35 |
| 9,114,536 B2 * | 8/2015 | Sussman | B25J 19/06 |
| 9,204,549 B2 * | 12/2015 | Kanno | H01R 27/02 |
| 9,492,921 B2 * | 11/2016 | Inaba | G05B 19/409 |

(Continued)

FOREIGN PATENT DOCUMENTS

| | | |
|---|---|---|
| JP | H02-083185 A | 3/1990 |
| JP | H08-126990 A | 5/1996 |

(Continued)

OTHER PUBLICATIONS

Bossche, A; "Programmable Logic Device Based Brushless DC Motor Control;" 2011; Ghent University (Year: 2011).*

(Continued)

*Primary Examiner* — Elaine Gort
*Assistant Examiner* — Christopher R Cardimino
(74) *Attorney, Agent, or Firm* — Oliff PLC

(57) ABSTRACT

A short-circuiting device according includes a short circuit that is electrically connected to a robot, the robot including a robotic arm and at least one motor, the robotic arm including at least one joint shaft that is provided with the respective at least one motor, the short circuit being provided separately from a robot controller configured to control the robot, the short circuit being configured to apply a dynamic brake to each motor.

5 Claims, 4 Drawing Sheets

(56) References Cited

U.S. PATENT DOCUMENTS

| | | | | |
|---|---|---|---|---|
| 9,676,103 | B2 * | 6/2017 | Tagashira | B25J 19/066 |
| 9,806,645 | B2 * | 10/2017 | Nishino | H02P 29/0243 |
| 9,943,968 | B2 * | 4/2018 | Geiler | B25J 9/161 |
| 2013/0221888 | A1 * | 8/2013 | Horikoshi | H02P 3/22 |
| | | | | 318/400.29 |
| 2015/0321089 | A1 * | 11/2015 | Akavia | A63F 13/235 |
| | | | | 463/39 |
| 2017/0155344 | A1 | 6/2017 | Nishino | |

FOREIGN PATENT DOCUMENTS

| | | | |
|---|---|---|---|
| JP | 2006263894 A | * | 10/2006 |
| JP | 6046424 B2 | * | 12/2016 |
| JP | 2017-001120 A | | 1/2017 |

OTHER PUBLICATIONS

Warner, N; "The Mars Science Laboratory Remote Sensing Mast;" 2016; NASA (Year: 2016).*

* cited by examiner

SHORT-CIRCUITING DEVICE AND ROBOT SYSTEM INCLUDING THE SAME

TECHNICAL FIELD

The present invention relates to a short-circuiting device and a robot system including the same.

BACKGROUND ART

Conventionally, a robot controller as disclosed in Patent Literature 1 has been known. Patent Literature 1 discloses, regarding the robot controller, that when a main power supply is not connected to a third connection and a power supply for maintenance is connected to a fourth connection, voltage from the power supply for maintenance is supplied to a brake drive circuit. As a result, the brake of a robotic arm is unlocked.

CITATION LIST

Patent Literature

PTL 1: Japanese Laid-Open Patent Application Publication No. 2017-1120

SUMMARY OF INVENTION

Technical Problem

In Patent Literature 1, the power supply for maintenance supplies electric power to the brake (non-excitation actuated electromagnetic brake) when the brake is not supplied with electric power from the main power supply, thereby switching the brake from a brake-applied state to a brake-released state. Thus, even when the brake is not supplied with electric power from the main power supply, the posture of the robot can be changed, which makes it possible to perform maintenance work or the like on the robot.

However, Patent Literature 1 has a problem in that when the brake is released, the posture of the robot suddenly changes (e.g., the robotic arm suddenly falls due to its own weight), which causes a danger. In order to solve such a problem, conventionally, for example, as shown in FIG. 7, a robotic arm 100 is in advance suspended by, for example, a crane 110, and thereby such a sudden fall of the robotic arm is prevented. However, such a conventional preventative measure is labor and time consuming.

In view of the above, an object of the present invention is to provide: a short-circuiting device that makes it possible to readily stabilize the posture of a robot; and a robot system including the short-circuiting device.

Solution to Problem

In order to solve the above-described problems, a short-circuiting device according to the present invention includes a short circuit that is electrically connected to a robot, the robot including a robotic arm and at least one motor, the robotic arm including at least one joint shaft that is provided with the respective at least one motor, the short circuit being provided separately from a robot controller configured to control the robot, the short circuit being configured to apply a dynamic brake to each motor.

According to the above configuration, a change in the posture of the robot can be suppressed by short-circuiting electrodes of the motor by the short circuit. Consequently, the short-circuiting device according to the present invention makes it possible to readily stabilize the posture of the robot.

The robot may further include at least one non-excitation actuated electromagnetic brake provided for the respective at least one motor. The short-circuiting device may further include an auxiliary power supply configured to supply electric power to the non-excitation actuated electromagnetic brake when the non-excitation actuated electromagnetic brake is not supplied with electric power from a main power supply of the robot.

According to the above configuration, the dynamic brake can be applied to each motor by the short circuit while releasing each non-excitation actuated electromagnetic brake by the auxiliary power supply. Consequently, a sudden change in the posture of the robot can be prevented, and the robot can be brought into a state in which the posture of the robot can be changed as desired.

The short-circuiting device may further include an auxiliary power supply switch configured to switch whether or not to supply electric power to the non-excitation actuated electromagnetic brake by the auxiliary power supply.

The above configuration makes it possible to release the non-excitation actuated electromagnetic brake at a desired timing.

The motor may be a three-phase motor including three electrodes. The short circuit may be configured to short-circuit two of, or all of, the three electrodes of the three-phase motor.

According to the above configuration, for example, as compared to a case where the motor is a single-phase motor, rotating magnetic fields can be obtained without special devising, and also, greater output power can be obtained.

The short-circuiting device may be configured to short-circuit electrodes of the motor by the short circuit at a same time as the short-circuiting device is mounted to the robot.

This configuration makes it possible to assuredly apply the dynamic brake before the non-excitation actuated electromagnetic brake is released.

The short-circuiting device may further include a short-circuit switch configured to switch whether or not to short-circuit electrodes of the motor by the short circuit.

The above configuration makes it possible to release the dynamic brake at a desired timing.

In order to solve the above-described problems, a robot system according to the present invention includes: a robot including a robotic arm and at least one motor, the robotic arm including at least one joint shaft that is provided with the respective at least one motor; and any one of the above-described short-circuiting devices.

According to the above configuration, a change in the posture of the robot can be suppressed by short-circuiting electrodes of the motor by the short circuit. Consequently, the robot system according to the present invention makes it possible to readily stabilize the posture of the robot.

Advantageous Effects of Invention

The present invention is able to provide: a short-circuiting device that makes it possible to readily stabilize the posture of a robot; and a robot system including the short-circuiting device.

DESCRIPTION OF EMBODIMENTS (Overall Configuration)

Figure 1:
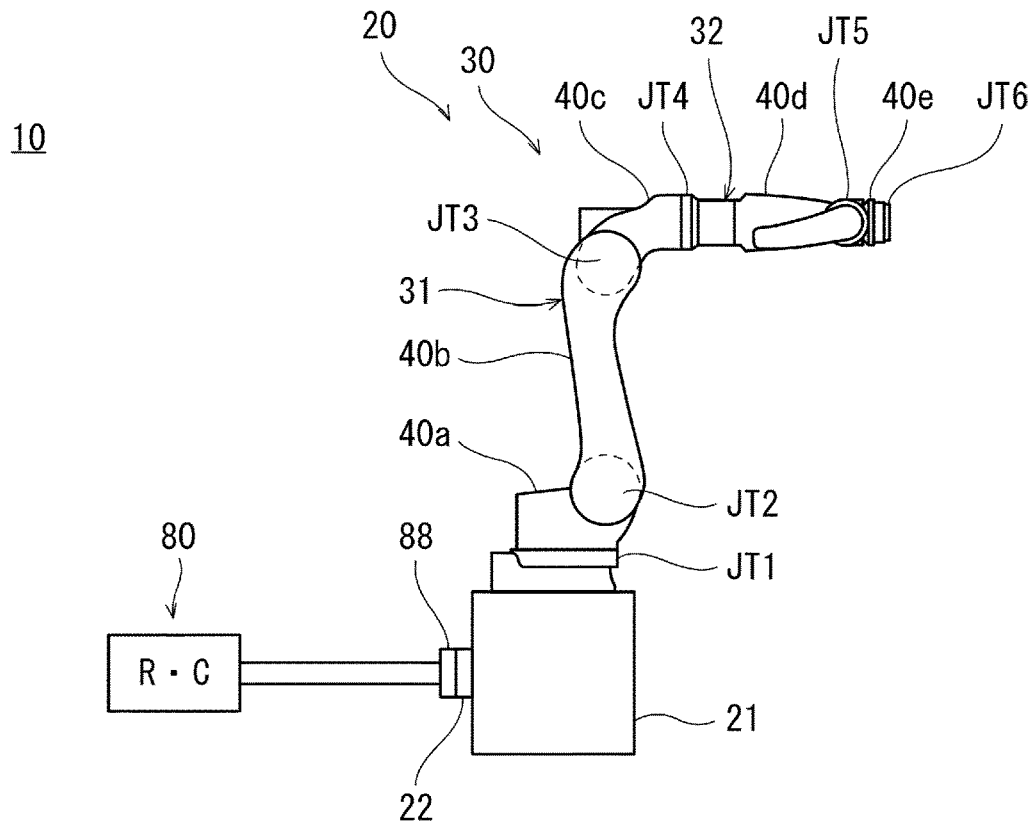
FIG. 1 is a schematic diagram showing an overall configuration of a robot system according to an embodiment of the present invention when a robot controller is mounted to a robot in the robot system.

Hereinafter, a short-circuiting device and a robot system including the same according to an embodiment of the present invention are described with reference to the drawings. It should be noted that the present invention is not limited to the present embodiment. In the drawings, the same or corresponding elements are denoted by the same reference signs, and repeating the same descriptions is avoided below.

(Robot System 10)

Figure 2:
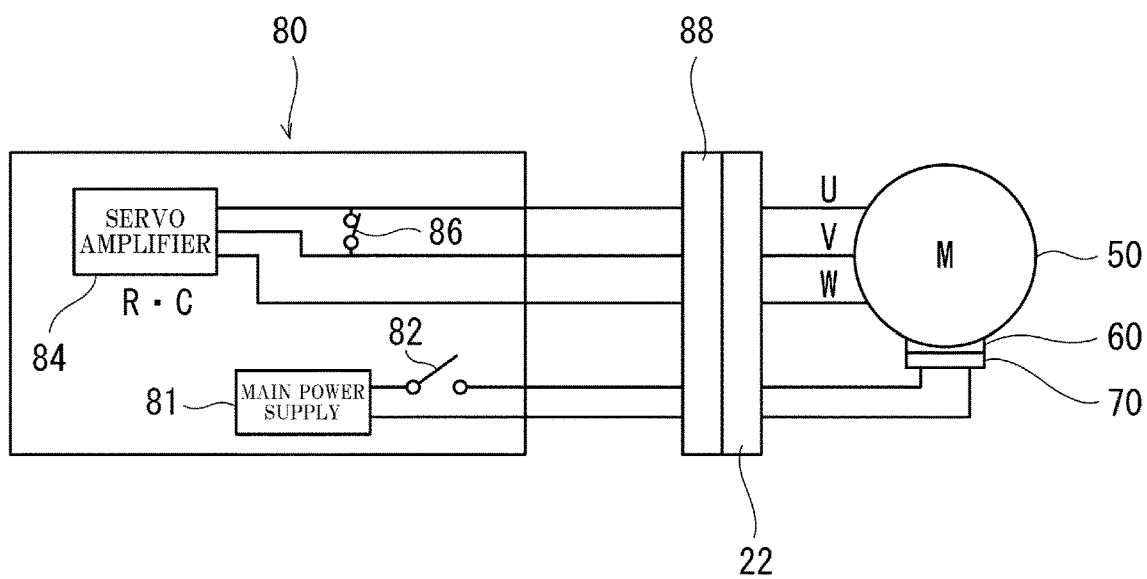
FIG. 2 is a simplified circuit diagram showing electrical connections when the robot controller is mounted to the robot in the robot system according to the embodiment of the present invention.

FIG. 1 is a schematic diagram showing an overall configuration of the robot system according to the embodiment of the present invention when a robot controller is mounted to a robot in the robot system. FIG. 2 is a simplified circuit diagram showing electrical connections when the robot controller is mounted to the robot.

A shown in FIG. 1 and FIG. 2, a robot system 10 according to the present embodiment includes: a robot 20 including a robotic arm 30; a robot controller 80 with a main power supply 81 incorporated therein, the robot controller 80 being configured to control the robot 20; and a short-circuiting device 90 (see FIGS. 4 to 6) according to the present invention. The short-circuiting device 90 will be described below.

(Robot 20)

The robot 20 includes: the robotic arm 30; motors 50 provided for six joint shafts JT1 to JT6 of the robotic arm 30, respectively; and non-excitation actuated electromagnetic brakes 60 provided for the motors 50, respectively. The robot 20 according to the present embodiment further includes: a base 21 coupled to the proximal end portion of the robotic arm 30; an unshown end effector mounted to the distal end portion of the robotic arm 30; and a mounting receiving portion 22, to which the robot controller 80 or the short-circuiting device 90 is mounted.

(Robotic Arm 30)

As shown in FIG. 1, the robotic arm 30 is a multi jointed arm that includes the six joint shafts JT1 to JT6 and six links 40a to 40f. The six links 40a to 40f are sequentially coupled by these joint shafts.

A coupled body of links and joint shafts is formed by the first joint shaft JT1, the first link 40a, the second joint shaft JT2, the second link 40b, the third joint shaft JT3, and the third link 40c. The coupled body of links and joint shafts constitutes a first arm part 31. Specifically, the first joint shaft JT1 couples the base 21 and the proximal end portion of the first link 40a in a manner to be rotatable about a vertical axis. The second joint shaft JT2 couples the distal end portion of the first link 40a and the proximal end portion of the second link 40b in a manner to be rotatable about a horizontal axis. The third joint shaft JT3 couples the distal end portion of the second link 40b and the proximal end portion of the third link 40c in a manner to be rotatable about a horizontal axis.

Another coupled body of links and joint shafts is formed by the fourth joint shaft JT4, the fourth link 40d, the fifth joint shaft JT5, the fifth link 40e, the sixth joint shaft JT6, and the sixth link 40f. This other coupled body of links and joint shafts constitutes a second arm part 32. Specifically, the fourth joint shaft JT4 couples the distal end portion of the third link 40c and the proximal end portion of the fourth link 40d in a manner to be rotatable about an axis extending in the longitudinal direction of the third link 40c. The fifth joint shaft JT5 couples the distal end portion of the fourth link 40d and the proximal end portion of the fifth link 40e in a manner to be rotatable about an axis extending in a direction orthogonal to the longitudinal direction of the fourth link 40d. The sixth joint shaft JT6 couples the distal end portion of the fifth link 40e and the proximal end portion of the sixth link 40f in a manner to be rotatable in a twisting fashion. The aforementioned unshown end effector is mounted to the distal end portion of the sixth link 40f.

(Motors 50)

The motors 50 are provided for the six joint shafts JT1 to JT6 of the robotic arm 30, respectively. FIG. 2 shows only one motor 50. Since the other five motors 50 are configured in the same manner as the one motor 50, the illustration and description of the other five motors 50 are omitted herein. As shown in FIG. 2, each motor 50 according to the present embodiment is a three-phase motor. The three phases are a U phase, a V phase, and a W phase.

For example, each motor 50 is a servomotor that is servo-controlled by the robot controller 80. The motors 50 are provided with position detectors 70, respectively. Each of the position detectors 70 detects the rotational position of a corresponding one of the motors 50. Each position detector 70 is, for example, an encoder.

Figure 3:
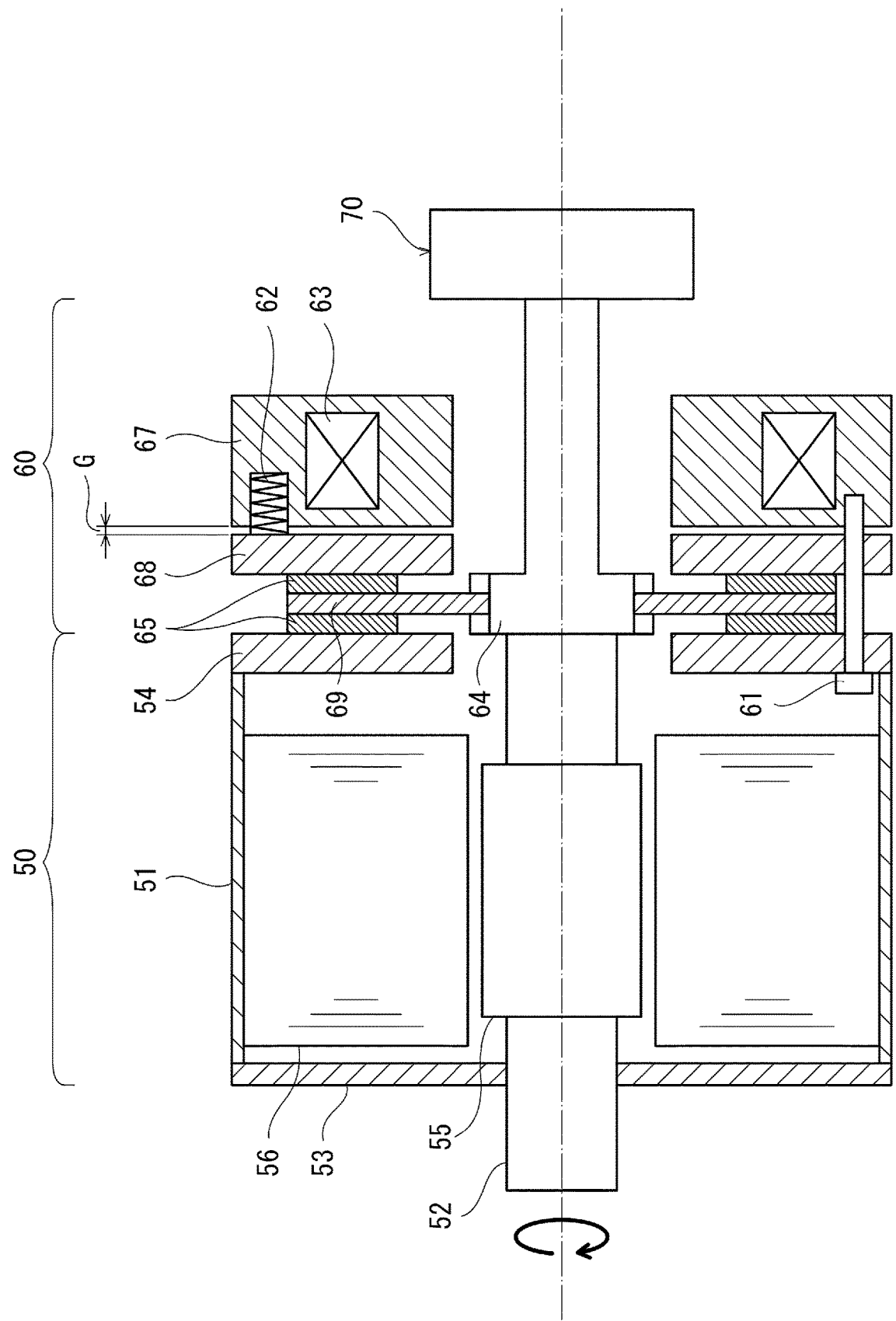
FIG. 3 shows one example of a configuration including a motor, a non-excitation actuated electromagnetic brake, and a position detector according to the embodiment of the present invention.

FIG. 3 shows one example of a configuration including the motor, the non-excitation actuated electromagnetic brake, and the position detector. It should be noted that, in the description below, the term "load side" refers to a load-mounting side of the motor 50. Specifically, in this example, the load side is the side on which a shaft 52 protrudes (i.e., the lower side of FIG. 3), and also, the term "non-load side" refers to the opposite side to the load side (i.e., the upper side of FIG. 3).

As shown in FIG. 3, the motor 50 includes: the shaft 52; a frame 51; a load-side bracket 53 provided on the load-side end portion of the frame 51; and a non-load-side bracket (which is hereinafter also called "plate") 54 provided on the non-load-side end portion of the frame 51. The load-side bracket 53 and the non-load-side bracket (plate) 54 are provided with an unshown load-side bearing and an unshown non-load-side bearing, respectively. The shaft 52 is rotatably supported via these bearings.

The motor 50 includes: a rotor 55 provided on the shaft 52; and a stator 56 provided on the inner circumferential surface of the frame 51. For example, the rotor 55 is provided with a plurality of unshown permanent magnets. The stator 56 includes: an unshown stator core disposed in an annular manner; and a plurality of unshown armature windings wound around a plurality of teeth of the stator core.

(Non-Excitation Actuated Electromagnetic Brake 60)

The motors 50 are provided with the non-excitation actuated electromagnetic brakes 60, respectively. Each non-excitation actuated electromagnetic brake 60 is configured to be applied to keep the robot 20 in the same posture when not being supplied with electric power, and to be released when being supplied with electric power.

As shown in FIG. 3, the non-excitation actuated electromagnetic brake 60 is disposed at the non-load side of the motor 50, and is configured to keep the shaft 52 stopped or to brake the shaft 52. It should be noted that the non-excitation actuated electromagnetic brake 60 may be disposed at the load side of the motor 50. The non-excitation actuated electromagnetic brake 60 is covered by an unshown brake cover. The non-excitation actuated electromagnetic brake 60 includes: a cylindrical field core 67; an annular armature 68 disposed in a manner to face the load side of the field core 67; and a brake disc 69 disposed between the armature 68 and the plate (non-load-side bracket) 54.

The field core 67 is fixed to the plate (non-load-side bracket) 54 by a bolt 61. The field core 67 is provided with a plurality of brake springs 62. The brake springs 62 press the armature 68 to urge the armature 68 to the load side. The field core 67 is also provided with a coil 63. The coil 63, when an electric current is supplied thereto, generates magnetic suction force to suck the armature 68 to the non-load side against the urging force of the brake springs 62. The armature 68 is made of a magnetic material (e.g., a steel plate).

The brake disc 69 is fixed to the shaft 52 via a hub 64. Annular brake linings 65 are attached to both the load-side surface and the non-load-side surface of the brake disc 69, respectively. The brake disc 69 is configured to be slidable in the axial direction of the shaft 52.

The non-excitation actuated electromagnetic brake 60 is configured such that, while no electric current is being supplied to the coil 63 (i.e., non-excitation state), the armature 68 is pressed toward the plate 54 (i.e., to the load side) by the urging force of the brake springs 62. As a result, the brake disc 69 and the brake linings 65 are sandwiched between the armature 68 and the plate 54. At the time, a gap G is formed between the field core 67 and the armature 68. Consequently, while the power supply is being cut off, the shaft 52 is kept stopped or the rotation of the shaft 52 is braked, which is a state where the non-excitation actuated electromagnetic brake 60 is being applied.

On the other hand, while an electric current is being applied to the coil 63 (i.e., excitation state), the armature 68 is moved toward the coil 63 (i.e., to the non-load side) by the magnetic suction force generated by the coil 63. As a result, the same amount of gap as the gap G is formed between the armature 68 and the plate 54, and thereby the brake disc 69 and the brake linings 65 become free. Consequently, while the motor 50 is in operation, the brake disc 69 is released from the braking, and the shaft 52 is rendered rotatable, which is a state where the non-excitation actuated electromagnetic brake 60 is released.

The position detector 70 is disposed at the non-load side of the non-excitation actuated electromagnetic brake 60, and is coupled to the shaft 52. It should be noted that the position detector 70 may be disposed at a different position, for example, between the motor 50 and the non-excitation actuated electromagnetic brake 60. The position detector 70 detects the rotational position of the motor 50 by detecting the rotational position (e.g., rotational angle) of the shaft 52, and outputs the detected position data. It should be noted that, in addition to or instead of the rotational position of the motor 50, the position detector 70 may detect at least one of the speed (e.g., rotational speed or angular speed) of the motor 50 and the acceleration (e.g., rotational acceleration or angular acceleration) of the motor 50.

(Robot Controller 80)

As shown in FIG. 1 and FIG. 2, the robot controller 80 is electrically connected to the robot 20 as a result of a mounting portion 88 of the robot controller 80 being mounted to the mounting receiving portion 22 of the robot 20. The robot controller 80 incorporates therein the following components: the main power supply 81 of the robot 20; a main power supply switch 82 configured to switch whether or not to supply electric power to the robot 20 by the main power supply 81; a servo amplifier 84 electrically connected to the U phase, the V phase, and the W phase of the motor 50; and a switch 86 provided between the motor 50 and the servo amplifier 84 and configured to switch whether or not to short-circuit the U phase and the V phase of the motor 50.

A specific configuration of the robot controller 80 for controlling the operation of the robot 20 is not particularly limited. As one example, the control of the operation of the robot 20 may be realized as a result of a known processor (such as a CPU) operating in accordance with a program stored in a storage unit (e.g., a memory).

The robot controller 80 may include an unshown power converter that controls the rotation of each motor 50 while controlling the supply of electric power to each motor 50. The power converter is a device configured to convert DC power supplied from the main power supply 81 into AC power, and may be, for example, a three-phase bridge inverter circuit including six semiconductor switching elements. For example, the six semiconductor switching elements may be constituted by six IGBTs with antiparallel-connected freewheeling diodes.

(Short-Circuiting Device 90)

Figure 4:
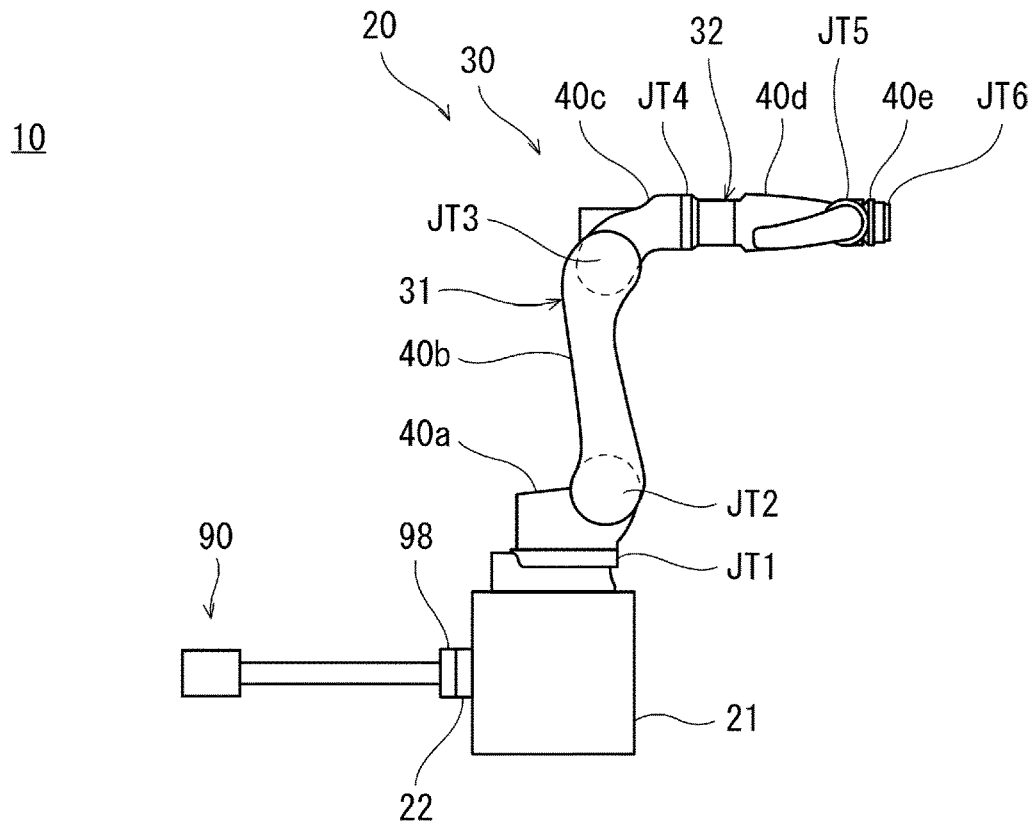
FIG. 4 is a schematic diagram showing an overall configuration of the robot system according to the embodiment of the present invention when a short-circuiting device is mounted to the robot in the robot system.
Figure 5:
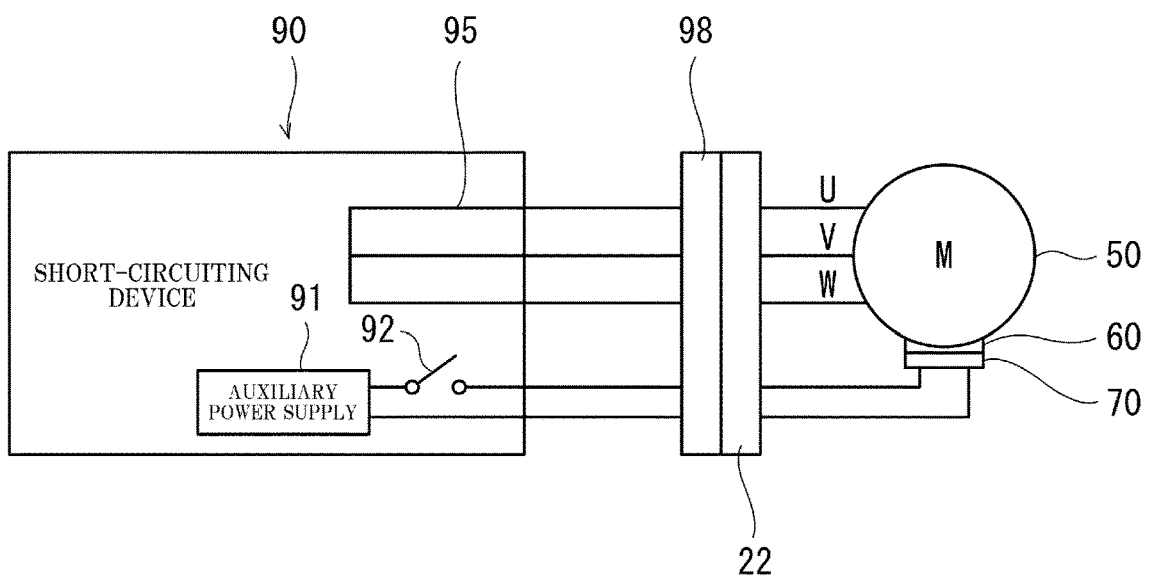
FIG. 5 is a simplified circuit diagram showing electrical connections when the short-circuiting device is mounted to the robot in the robot system according to the embodiment of the present invention.

FIG. 4 is a schematic diagram showing an overall configuration of the robot system according to the embodiment of the present invention when the short-circuiting device is mounted to the robot in the robot system. FIG. 5 is a simplified circuit diagram showing electrical connections when the short-circuiting device is mounted to the robot. As shown in FIG. 4, the short-circuiting device 90 according to the present embodiment is mounted to the robot 20 in a case where the robot controller 80 is not mounted to the robot 20. Specifically, similar to the aforementioned mounting portion 88 of the robot controller 80, the short-circuiting device 90 is electrically connected to the robot 20 as a result of a mounting portion 98 of the short-circuiting device 90 being mounted to the mounting receiving portion 22 of the robot 20.

As shown in FIG. 5, the short-circuiting device 90 includes: an auxiliary power supply 91 configured to supply electric power to each non-excitation actuated electromagnetic brake 60 when the non-excitation actuated electromagnetic brake 60 is not supplied with electric power from the main power supply 81; and a short circuit 95 configured to apply a dynamic brake to each motor 50. The short-circuiting device 90 according to the present embodiment further includes an auxiliary power supply switch 92 configured to switch whether or not to supply electric power to each motor 50 by the auxiliary power supply 91.

(Auxiliary Power Supply 91)

When the non-excitation actuated electromagnetic brake 60 is not supplied with electric power from the main power supply 81, the auxiliary power supply 91 supplies electric power to the non-excitation actuated electromagnetic brake 60 to bring the non-excitation actuated electromagnetic brake 60 into a released state. It should be noted that the auxiliary power supply 91 is intended for supplying electric power to the non-excitation actuated electromagnetic brake 60. Therefore, unlike the above-described robot controller 80, the auxiliary power supply 91 does not include a power supply device intended for the motor (e.g., main power supply 81).

(Short Circuit 95)

The short circuit 95 is configured to short-circuit all of the three electrodes (U-phase electrode, V-phase electrode, and W-phase electrode) of the motor 50 to each other. It should be noted that the short circuit 95 may be configured to short-circuit two electrodes (i.e., U-phase and V-phase electrodes, U-phase and W-phase electrodes, or V-phase and W-phase electrodes,) among the three electrodes of the motor 50. As shown in FIG. 5, when the short-circuiting device 90 is electrically connected to the robot 20 (i.e., when the mounting portion 98 is mounted to the mounting receiving portion 22), the short circuit 95 is configured to short-circuit all of the three electrodes of the motor 50 to each other. That is, the short-circuiting device 90 according to the present embodiment is configured to short-circuit the electrodes of the motor 50 by the short circuit 95 at the same time as the short-circuiting device 90 is mounted to the robot 20.

(Advantageous Effects)

According to the short-circuiting device 90 of the present embodiment, a change in the posture of the robot 20 can be suppressed by short-circuiting the electrodes of the motor 50 to each other by the short circuit 95. Consequently, the short-circuiting device 90 according to the present invention makes it possible to readily stabilize the posture of the robot 20.

The short-circuiting device 90 according to the present embodiment includes the auxiliary power supply 91 configured to supply electric power to each non-excitation actuated electromagnetic brake 60 when the non-excitation actuated electromagnetic brake 60 is not supplied with electric power from the main power supply 81. Accordingly, the dynamic brake can be applied to each motor 50 by the short circuit 95 while releasing each non-excitation actuated electromagnetic brake 60 by the auxiliary power supply 91. Consequently, a sudden change in the posture of the robot 20 can be prevented, and the robot 20 can be brought into a state in which the posture of the robot 20 can be changed as desired. This makes it possible to suitably perform, for example, maintenance work or the like on the robot 20.

Moreover, the short-circuiting device 90 according to the present embodiment further includes the auxiliary power supply switch 92 configured to switch whether or not to supply electric power to the non-excitation actuated electromagnetic brake 60 by the auxiliary power supply 91. This makes it possible to release the non-excitation actuated electromagnetic brake 60 at a desired timing. Accordingly, after the short-circuiting device 90 is mounted to the robot 20, for example, safety is secured, and then electric power is supplied from the auxiliary power supply 91 to the non-excitation actuated electromagnetic brake 60. In this manner, a danger that might occur when electric power is supplied from the auxiliary power supply 91 can be prevented.

Furthermore, in the present embodiment, the motor 50 is a three-phase motor, and the short circuit 95 is configured to short-circuit the three electrodes of the three-phase motor to each other. Accordingly, for example, as compared to a case where the motor 50 is a single-phase motor, rotating magnetic fields can be obtained without special devising, and also, greater output power can be obtained.

Further, the short-circuiting device 90 according to the present embodiment is configured to short-circuit the electrodes of the motor 50 by the short circuit 95 at the same time as the short-circuiting device 90 is mounted to the robot 20. This makes it possible to assuredly apply the dynamic brake before the non-excitation actuated electromagnetic brake 60 is released. Therefore, for example, an erroneous operation that might occur in the case of being equipped with a short-circuit switch for switching whether or not to short-circuit the electrodes of the motor 50 by the short circuit 95 (e.g., an erroneous operation that causes a situation where both the non-excitation actuated electromagnetic brake 60 and the dynamic brake are not being applied) can be prevented.

It should be noted that the robot system 10 according to the present embodiment includes: the robot 20 including the robotic arm 30 and the motors 50, the robotic arm 30 including the six joint shafts JT1 to JT6, which are provided with the respective motors 50; and the above-described short-circuiting device 90. According to this configuration, the posture of the robot 20 can be readily stabilized.

(Variations)

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

Figure 6:
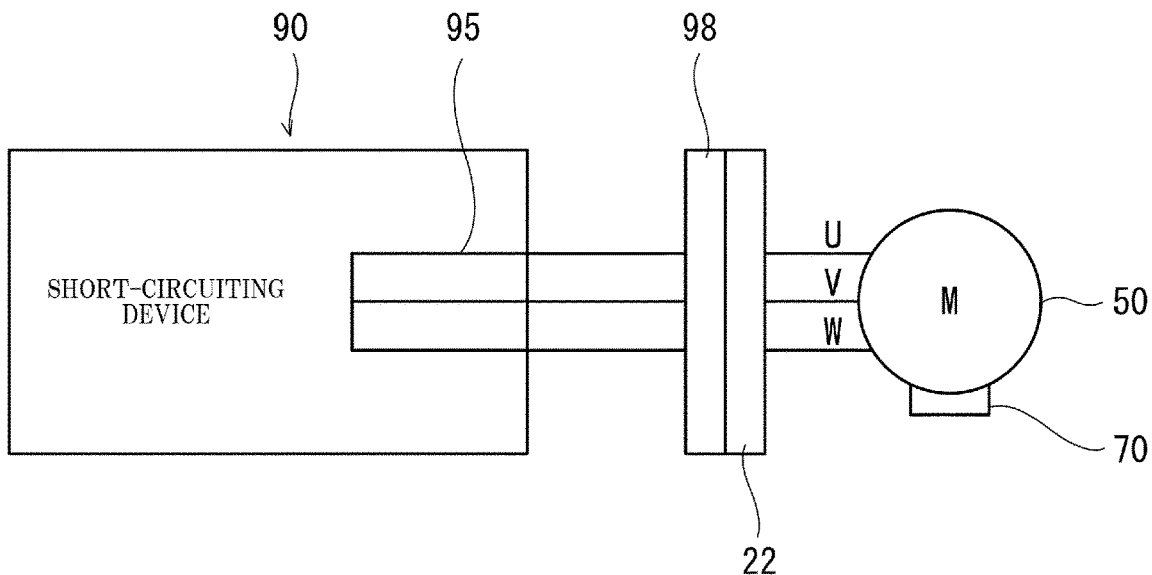
FIG. 6 is a simplified circuit diagram showing electrical connections when the short-circuiting device is mounted to the robot in a robot system according to a variation of the present invention.
Figure 7:
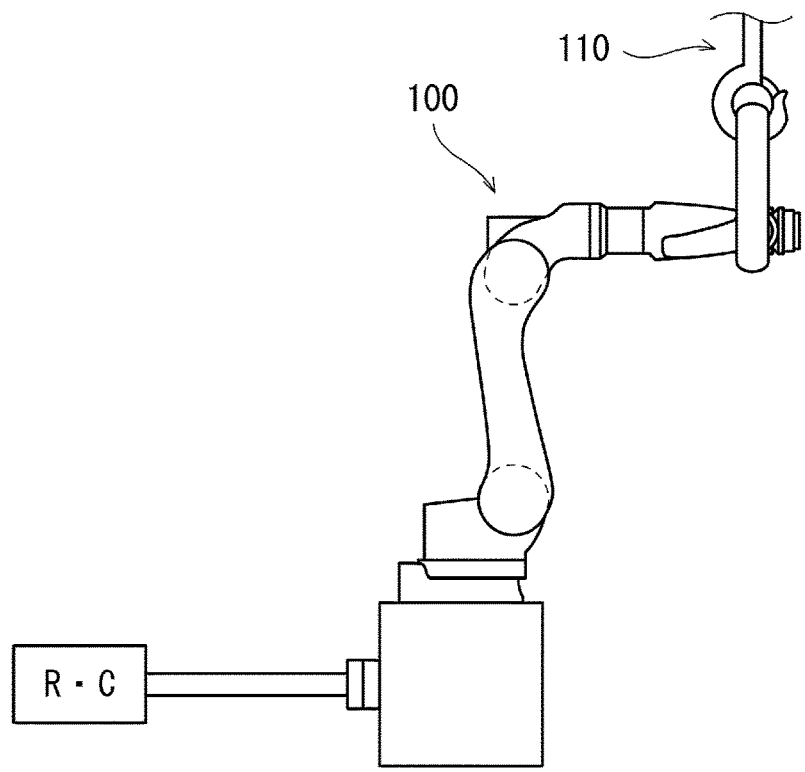
FIG. 7 is a schematic diagram showing a robotic arm in a conventional robot system, the robotic arm being suspended by a crane or the like in order to prevent a sudden fall of the robotic arm due to its own weight.

The foregoing description has described the case in which the short-circuiting device 90 according to the above embodiment includes the auxiliary power supply 91 configured to supply electric power to the non-excitation actuated electromagnetic brake 60. However, the present invention is not thus limited. That is, in the short-circuiting device 90 according to the present invention, the auxiliary power supply 91 may be absent as shown in FIG. 6. FIG. 6 is a simplified circuit diagram showing electrical connections when the short-circuiting device is mounted to the robot in a robot system according to a variation of the present invention.

For example, in the case of packing up the robot while keeping the robot in a desired posture by using a fixing jig, the short-circuiting device 90 according to the present variation shown in FIG. 6 may be mounted to the robot, and thereby the dynamic brake may be applied to the motor 50 so that the posture of the robot will hardly change. Consequently, for example, at the time of unpacking and installing the robot, a sudden change in the posture of the robot can be prevented when removing the fixing jig from the robot.

Generally speaking, the motor 50 of a conventional horizontal articulated robot is not provided with a non-excitation actuated electromagnetic brake. Therefore, the short-circuiting device 90 according to the above variation is particularly advantageously applicable to, for example, such a horizontal articulated robot. It should be noted that, in such a horizontal articulated robot, generally speaking, a dynamic brake is applied to the motor 50 as necessary by a short circuit included in a robot controller.

The above embodiment has described the case in which the robot controller 80 is mounted to the robot 20 in a detachable manner. However, the present invention is not thus limited. The robot controller 80 may be mounted to the robot 20 in a non-detachable manner. For example, the robot controller 80 may be incorporated in the robot 20. In such a case, for example, after the robot controller 80 is turned OFF, the short-circuiting device 90 according to the present invention may be mounted to the robot 20.

The above embodiment has described the case in which the motor 50 is configured as a three-phase motor. However, the present invention is not thus limited. For example, the motor 50 may be configured as a single-phase motor.

The foregoing description has described the case in which the short-circuiting device 90 according to the above embodiment is configured to short-circuit all of the three electrodes of the motor 50 by the short circuit 95 at the same time as the short-circuiting device 90 is mounted to the robot 20. However, the present invention is not thus limited. Specifically, the short-circuiting device 90 may further include a short-circuit switch configured to switch whether or not to short-circuit the electrodes of the motor 50 by the short circuit. This makes it possible to release the dynamic brake at a desired timing. Consequently, for example, when the non-excitation actuated electromagnetic brake 60 is in a released state as a result of being supplied with electric power from the auxiliary power supply 91, the dynamic brake may also be resealed after the safety is secured, and thereby the posture of the robot 20 may be rendered readily changeable. This makes it possible to more readily perform maintenance work or the like on the robot 20.

The above embodiment has described the case in which the robotic arm 30 is a multi-jointed arm with six joint shafts. However, the present invention is not thus limited. Specifically, the robotic arm 30 is required to be an arm with at least one joint shaft. Moreover, the robotic arm 30 may be an arm with a linear motion shaft.

REFERENCE SIGNS LIST 10 robot system
20 robot
21 base
22 mounting receiving portion
30 robotic arm
31 first arm part
32 second arm part
40 link
50 motor
51 frame
52 shaft
53 load-side bracket
54 non-load-side bracket
55 rotor
56 stator
60 non-excitation actuated electromagnetic brake
61 bolt
62 brake spring
63 coil
64 hub
65 brake lining
67 field core
68 armature
69 brake disc
70 position detector
80 robot controller
81 main power supply
82 main power supply switch
84 servo amplifier
86 switch
88 mounting portion
90 short-circuiting device
91 auxiliary power supply
92 auxiliary power supply switch
95 short circuit
98 mounting portion
100 conventional robotic arm
110 crane
JT joint shaft

The invention claimed is:

1. A robot system, comprising:
a short-circuiting device that includes a short circuit mounting portion and a short circuit;
a robot with a robot mounting portion, a robotic arm, at least one motor and at least one non-excitation actuated electromagnetic brake provided for the respective at least one motor, the robotic arm including at least one joint shaft that is provided with the respective at least one motor; and
a robot controller that includes a robot controller mounting portion that is configured to be electrically connected to the robot mounting portion of the robot via the robot controller mounting portion, wherein:
the short circuit is electrically connected to the robot mounting portion of the robot via the short circuit mounting portion,
the short circuit is provided separately from the robot controller configured to control the robot,
the short circuit is configured to apply a dynamic brake to each motor,
the robot mounting portion is a common mounting portion that can be mounted to both of the short circuit mounting portion and the robot controller mounting portion such that the robot mounting portion can be separately electrically connected to either the short circuit mounting portion or the robot controller mounting portion but cannot be electrically connected to both the short circuit mounting portion and the robot controller mounting portion at a same time,
the short-circuiting device further comprises an auxiliary power supply configured to supply electric power to the non-excitation actuated electromagnetic brake when the non-excitation actuated electromagnetic brake is not supplied with electric power from a main power supply of the robot, and
the short-circuiting device is configured such that the auxiliary power supply supplies electric power to the non-excitation actuated electromagnetic brake in order to release the at least one non-excitation actuated electromagnetic brake while the short circuit applies the dynamic brake to each motor.

2. The robot system according to claim 1, wherein the short-circuiting device further comprising an auxiliary power supply switch configured to switch whether or not to supply electric power to the non-excitation actuated electromagnetic brake by the auxiliary power supply.

3. The robot system according to claim 1, wherein
the motor is a three-phase motor including three electrodes, and
the short circuit is configured to short-circuit two of, or all of, the three electrodes of the three-phase motor.

4. The robot system according to claim 1, wherein the short-circuiting device is configured to short-circuit electrodes of the motor by the short circuit at a same time as the short-circuiting device is mounted to the robot.

5. The robot system according to claim 1, wherein the short-circuiting device further comprising a short-circuit switch configured to switch whether or not to short-circuit electrodes of the motor by the short circuit.

* * * * *